May 16, 1944.    P. B. DRANE    2,348,888
PRESSURE RELIEF SYSTEM FOR STORAGE TANKS
Filed July 3, 1941
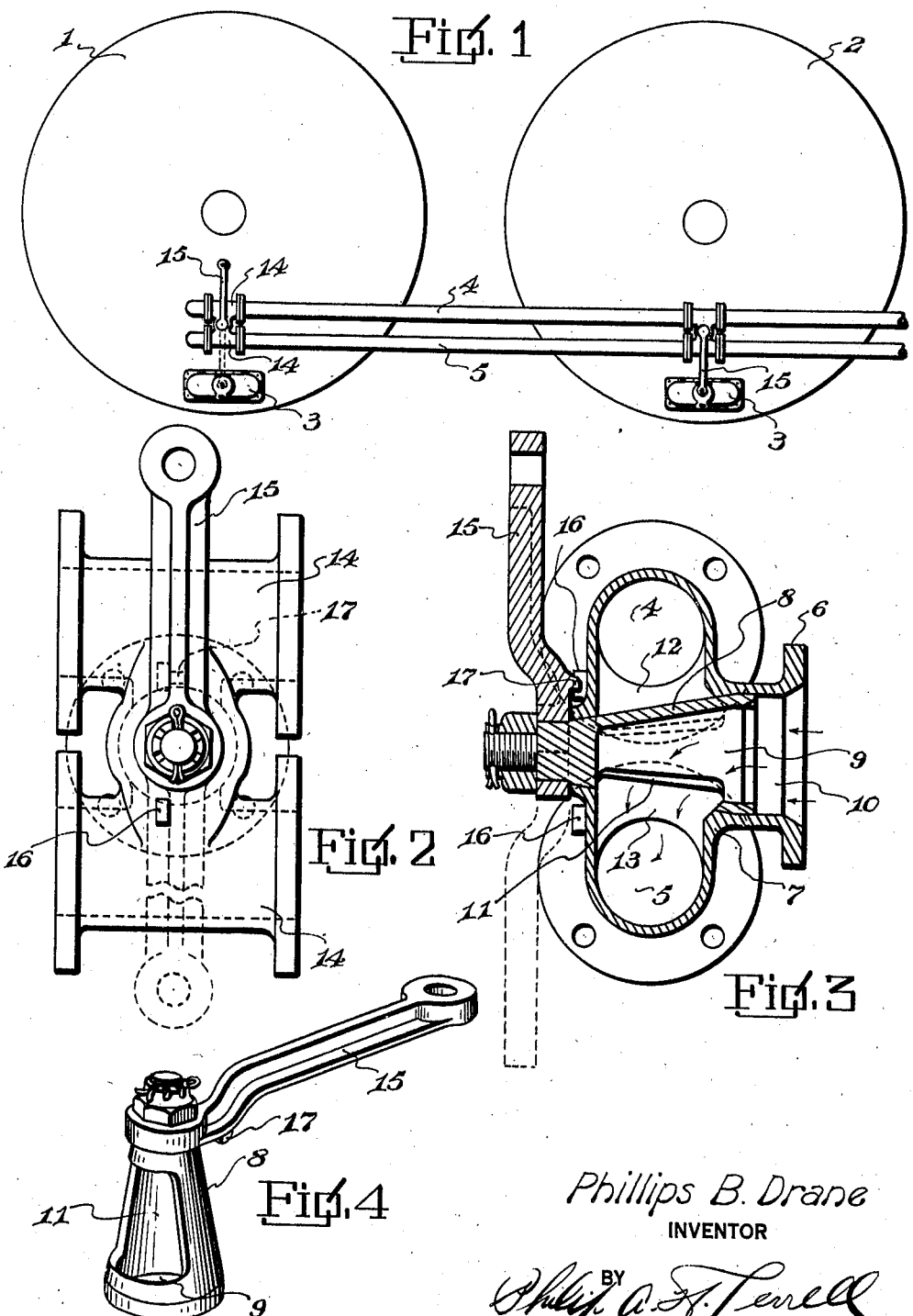
Phillips B. Drane
INVENTOR Patented May 16, 1944

2,348,888

UNITED STATES PATENT OFFICE 2,348,888

PRESSURE RELIEF SYSTEM FOR STORAGE TANKS

Phillips B. Drane, Tulsa, Okla.

Application July 3, 1941, Serial No. 401,051

7 Claims. (Cl. 220—85)

The invention relates to pressure relief or blow-off systems for oil storage tanks, particularly a battery of tanks, and has for its object to provide the tanks with an equalizing line for equalizing the pressure within the various tanks, a pressure blow-off line, and means whereby the pressure within any tank may be relieved through the equalizing line to the blow-off line.

A further object is to provide a blow-off line in connection with an equalizing line and a series of tanks and valve control means whereby the pressure within any of the tanks may be relieved before opening the tank hatch, preparatory to a thieving operation.

A further object is to provide a control valve for the equalizing and blow-off lines with a handle member or extension which extends across the hinged hatch when the blow-off line is cut off from the tank, thereby warning and preventing the operator from opening the hatch until pressure is released from the particular tank.

A further object is to position the plug valve between adjacent portions of the equalizing line and the blow-off line, and to construct said plug valve so that when it is in one position the gases in the tank will flow into the equalizing line, and when in the other position will allow the gases from the tank to pass into the blow off line.

A further object is to provide an equalizing line to permit gases to flow from tank to tank relieving either pressure or vacuum in any tank and to provide means in said equalizing line for relieving either excessive or dangerous pressure or vacuum.

A further object is to provide the plug valve casing with an axial branch adapted to be attached to the top of the tank and opposite sides of the plug valve casing with flanged chambered extensions adapted to be received in the equalizing and blow-off lines.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of a series of conventional oil storage tanks showing the system applied thereto.

Figure 2 is a top plan view of the valve, showing the handle in blow-off position.

Figure 3 is a transverse sectional view through the valve structure, taken on line 3—3 of Figure 2.

Figure 4 is a perspective view of the valve and handle.

Referring to the drawing, the numerals 1 and 2 designate oil storage tanks, which may be any number desired, two being shown for purposes of illustration only. The tanks are provided with conventional hatch closures 3, adapted to be opened from time to time for thieving operation. On account of the pressure built up in the various tanks, it is desirable to connect the tanks by an equalizing pipe or line 4 so the pressure and vacuum will be equalized in the tanks. At the same time, due to the pressures built up, it is desirable to exhaust the pressure from the tanks before opening the hatches 3, and to accomplish this result a blow-off line 5 is provided. This line, preferably, parallels the equalizing line 4 in relative close relation thereto, particularly where the valve structure hereinafter set forth is applied. If desired a conventional stack may be used in connection with blow off line, however it may be understood this can be eliminated if desired.

Mounted on each tank by means of a flange 6 is plug valve casing 7 in which is rotatably mounted a plug valve 8 having an axial chamber 9 therein in communication with the lower end of the chamber 10 of the casing. One side of the plug valve 8 is provided with a port 11, adapted to be placed into registry with either the port 12, leading to the equalizing line, or the port 13 leading to the blow-off line 5, therefore it will be seen that pressure from any of the tanks will be discharged into the equalizing line 4 when the valve is in one position and when the valve is moved to the other position, preparatory to a thieving operation, the pressure will be discharged into the blow-off line and exhausted to the atmosphere, no matter which tank valve is manipulated, as all the valves are in an intermediate position between the lines 4 and 5.

Each valve casing 7 is provided with flanged chambered extensions 14 which are connected in the equalizing line 4 and the blow-off line 5, clearly shown in Figure 1. The valves are preferably disposed adjacent the hatch closures 3 and provided with hand levers 15, adapted to be grasped by the operator for rotating the valves 8 180° between stops 16 on the valve casing 7, and this movement is limited by the lugs 17 carried by the hand levers. The hand levers 15 are positioned on the plug valves 8, whereby the equalizing pipe 4 will be in communication with the tank when the levers extend over the hatch closure 3. This acts as a warning to the operator that pressure should be exhausted to the blow-off line before opening a hatch, and at the same time the levers would interfere with the opening of the hatch.

When a thieving operation is to be made, the operator moves the hand lever 15 from the dotted line position to the full line position, shown on tank 1. This operation moves the plug valve 8 to the position shown in Figure 3, thereby allowing exhaust of pressure from the tank through the plug valve chamber 9 to the blow-off line. After the thieving operation the hatch is closed and the hand lever is moved to a position overlying the hatch as shown in Figure 2.

From the above it will be seen that a pressure relief and blow-off system is provided in connection with a series of storage tanks, simple in construction, and one which may be easily applied to tanks at present constructed and also in original installations. It will also be seen that the operator will have only to manipulate a single valve for the blow-off operation and for the equalizing operation.

The invention having seen set forth what is claimed as new and useful is:

1. The combination with a plurality of pressure tanks, of a tank equalizing line connected to each tank, a tank blow-off line connected to each tank, a single valve carried by each tank for controlling the passage of gasses to the equalizing line and the blow-off line, independent hand levers carried by each of said valves for operating their respective valves, said hand levers being limited in their movement, hatch closures carried by said tanks adjacent the valves, said hand levers overlying the hatch closures when the equalizing line is open to the tanks through the opened valves, said hand levers being out of the path of the hatch covers when the pressure from the tanks is passing to the blow-off line through the opened valves.

2. An equalizing and blow-off system for a plurality of pressure tanks, said system comprising an equalizing line above the tanks, a blow-off line above the tanks, the portions of said lines adjacent the tanks being adjacent each other, valve casings communicating respectively with the tanks and extending upwardly to a position between the lines, a plug valve in each of said casings having an axial pressure port extending upwardly therein and outwardly to the periphery thereof and adapted to discharge into the equalizing line or the blow-off line according to the position of the valve, said valve casings having chambered connections with the equalizing and blow-off lines and means for rotating said plug valves to an equalizing or blow-off position.

3. A device as set forth in claim 2 including a hand lever carried by the plug valve and means for limiting the movement of said hand lever.

4. A device as set forth in claim 2 including a hinged hatch cover carried by each tank, a hand lever carried by each plug valve, said hand lever being positioned whereby it will overlie the hatch cover in the path of the cover when the hatch cover is closed and when pressure is passing to the equalizing line and will be out of the path of the cover when pressure is passing to the blow-off line thereby allowing the cover to be opened.

5. A system of equalizing and blowing off pressure in a plurality of pressure tanks comprising an equalizing line, a blow-off line and a single valve carried by each tank, each of said valves constructed and arranged to connect its respective tank to the equalizer line or to the pressure line and forming means whereby the pressure from either tank may be directed into either the equalizing line or into the blow-off line.

6. A device as set forth in claim 2 including a hinged hatch closure carried by each tank, control means for said valves, said valve control means being positioned whereby it will overlie the hatch covers in the path thereof and will prevent hinged opening thereof when the pressure is passing to the equalizing line and will be out of the path of the covers when the pressure is passing to the blow-off line.

7. The combination of a plurality of pressure tanks having independent pressure relief and vacuum equalizing lines, of a single valve means carried by each tank, said valve means of each tank being so constructed and arranged so that in one position it establishes communication with its associated tank and the pressure relief line and that in another position it establishes communication with its associated tank and the equalizing line, whereby the pressure in their respective tanks may be exhausted to the pressure line and the vacuum relieved through the equalizing line.

PHILLIPS B. DRANE.